United States Patent Office 3,038,942
Patented June 12, 1962

3,038,942
PREPARATION OF ALDEHYDES BY CATALYTIC OXIDATION

Ralph O. Kerr, Houston, Tex., and Robert W. Etherington, Jr., Pennington, N.J., assignors to Petro-Tex Chemical Corporation, Houston, Tex., a corporation of Delaware
No Drawing. Filed Mar. 13, 1959, Ser. No. 799,104
2 Claims. (Cl. 260—604)

This invention relates to an improved process for the manufacture of aldehydes by catalytic oxidation of olefins and relates more particularly to an improved process for producing unsaturated aliphatic aldehydes such as methacrolein by reacting a mixture of air and an olefinic hydrocarbon such as isobutylene in the presence of a novel catalyst therefor.

Production of aliphatic aldehydes by vapor phase catalytic oxidation of hydrocarbons is known. The principal method currently employed for making acrolein and methacrolein is by the catalytic oxidation of propylene and isobutylene in the presence of catalysts such as cuprous or cupric oxide.

It is an object of this invention to provide an improved process for obtaining high yields of aldehydes by vapor phase oxidation of hydrocarbons. It is another object of this invention to provide an improved process for the vapor phase oxidation of mono-olefins, particularly propylene and isobutylene to acrolein and methacrolein in high yields. It is a further object of this invention to provide a novel and improved catalyst useful in obtaining increased yield of product by vapor phase catalytic oxidation of olefins to unsaturated aliphatic aldehydes, and a method for making the same. Other objects and advantages of the invention will be apparent from the description thereof which follows.

It has been found that a vanadium-molybdenum-phosphorous-oxygen-containing catalyst, prepared by methods hereinafter described, is effective in converting olefins such as isobutylene to unsaturated aliphatic aldehydes such as methacrolein at yields as high as about 100 weight percent under the reaction conditions specified hereinafter. This substantial conversion of isobutylene to methacrolein has obvious economic commercial advantages.

The catalyst is believed to be a vanadium-molybdenum oxyphosphate, vanadyl-molybdyl phosphate, and may be considered as the mixed oxides of vanadium, molybdenum and phosphorous in a lattice structure. In order to obtain optimum results from the novel catalyst of this invention, the weight percent ratio of vanadium, phosphorous and molybdenum, calculated as $V_2O_5$, $P_2O_5$ and $MoO_3$ in the vanadium-molybdenum-phosphorous complex should be greater than 35 percent $V_2O_5$ with between 1 and 60 percent each of $P_2O_5$ and $MoO_3$, more preferably from about 40 to 70 percent $V_2O_5$, about 15 to 45 percent $P_2O_5$ and about 5 to 45 percent $MoO_3$. Although the vanadium-molybdenum oxyphosphate may be separately formed into pellets, it is more economical and practical to deposit this material on an inert carrier. The amount of vanadium-molybdenum oxyphosphate on the carrier normally is varied from about 5 to about 60 weight percent, and more preferably from about 10 to about 20 weight percent on an inert carrier such as Alundum or silicon carbide. The amount of vanadium-molybdenum oxyphosphate deposited on the carrier should be enough to substantially coat the surface of the carrier and this normally is obtained with the ranges set forth above. With more absorbent carriers, larger amounts of material will be required to obtain essentially complete coverage of the carrier. Excess vanadium-molybdenum oxyphosphate, over that required to coat the carrier surface, is not necessary and usually will be lost by mechanical attrition.

The novel catalyst of this invention may be prepared in a number of ways. For example, vanadium and molybdenum oxysalts such as the oxychlorides are reacted with phosphoric acid to form the desired complex. The resulting vanadium-molybdenum phosphate complex is deposited from solution on an inert carrier such as Alundum. The treated Alundum has thereon a uniform coating of the oxyphosphate complex.

One satisfactory procedure for preparing a typical catalyst of this invention is as follows. Vanadium pentoxide is dissolved slowly and carefully in concentrated hydrochloric acid and the mixture warmed slowly. After the initial reaction the mixture is refluxed until a clear blue solution of the homogeneous complex of vanadyl chlorides (vanadium oxychloride) is obtained. Molybdenum trioxide is then dissolved in the vanadium oxychloride and refluxed. Concentrated phosphoric acid is then added to the solution of vanadium and molybdenum oxychlorides and the mixture again refluxed. This solution is then concentrated to a point just above saturation. The complex, vanadium-molybdenum oxyphosphate-oxychloride, is the major constituent of the blue solution. To this hot concentrated solution there is added Alundum which has been extracted with concentrated hydrochloric acid, washed with distilled water and dried. This mixture is treated by combined heating, tumbling and stirring to obtain a free flowing catalytic material. The drying should proceed slowly and carefully so as to not destroy the uniform coating of vanadium and molybdenum oxyphosphate on the surface of the Alundum. The vanadium in this complex has an oxidation state or valence of four to five and the molybdenum four to six.

The novel catalysts of the invention can also be readily prepared, in addition to the preferred procedure set forth above, by dissolving vanadium pentoxide and molybdenum trioxide in hydrogen iodide or hydrogen bromide to form the oxyhalides. Likewise, the anhydride of phosphoric acid, $P_2O_5$, may be employed in place of phosphoric acid. In addition to vanadium and molybdenum oxychloride, other vanadium and molybdenum salts which contain an anion derived from an acid which is more volatile than phosphoric acid and which is not an oxidizing agent may be used in place of vanadium and molybdenum oxychloride. Thus, the oxysalts of hydriodic acid, hydrobromic acid, acetic acid, and less desirably, hydrofluoric acid and sulfuric acid and the like may be employed. Salts of nitric acid and similar oxidizing acids should be avoided. Hydrochloric acid and vanadium pentoxide and molybdenum trioxide, or vanadium and molybdenum oxychloride, or equivalent oxysalts such as the oxybromide or oxyiodide, regardless of how prepared, are preferred because of the economics and ease of preparation and use thereof to make the defined catalyst. Dilute acids, both hydrochloric and phosphoric, or dilute solutions of the vanadium salts, may be employed, but this is normally not desirable since large volumes of material have to be handled and it is more costly and time consuming to remove the excess water. Normally, the solution of vanadium and molybdenum oxyphosphate is concentrated to a saturated solution and the Alundum or other inert carrier added thereto. This is for expediency and more dilute solutions may be employed although longer periods of time to obtain the dried catalyst material are required. The Alundum may be present during the whole course of reactions to provide the desired vanadium-molybdenum phosphate complex.

The support or carrier for the vanadium-molybdenum phosphate complex should be inert to both the depositing solution containing the vanadium-molybdenum oxyphosphate-oxychloride and inert under the catalytic oxidation conditions, and provides not only the required surface for the catalyst but gives physical strength and stability to the catalyst material. The carrier or support preferably has a low surface area, as usually measured, at from about just above 0 to about 5 square meters per gram. A desirable form of carrier is one which has a dense non-absorbing center and a rough enough surface to aid in retaining the catalyst adhered thereto during handling and under reaction conditions. The carrier may vary in size, but preferably is from about 2 mesh to about 10 mesh. Alundum particles as large as ¼ inch are satisfactory and carriers much smaller than 10 to 12 mesh normally cause an undesirable pressure drop in the reactor. Very useful carriers are Alundum and silicon carbide or Carborundum. Any of the Alundums or other inert alumina carriers of low surface area may be used. Likewise a variety of silicon carbides may be employed. Silicon gel has been used. Although more economical use of the catalyst on a carrier in fixed beds is obtained, the catalyst may be employed in fluid bed systems. Of course, the particle size of the catalyst used in fluidized beds is quite small, varying from about 10 to about 150 microns, as high as 50 to 100 mesh. In such systems the catalyst normally will not be provided with a carrier but will be formed into the desired particle size after drying from solution.

Prior to use, the catalytic material is placed in carbon-steel reactor tubes used to convert isobutylene to methacrolein, and is conditioned by passing 50 grams of isobutylene per liter of catalyst per hour in a concentration of 0.7 mole percent isobutylene in air over the catalyst. The temperature is slowly raised over a period of 72 hours to about 480 to 515° C. Thereafter isobutylene in air is passed over the catalyst at a concentration of about 1.2 mole percent isobutylene at the rate of 100 grams isobutylene per liter of catalyst per hour and the methacrolein product collected from the gaseous effluent from the reactor. Of course, the methacrolein produced may be collected beginning at the start of the conditioning period if desired.

The reaction involving vapor phase oxidation of olefins to aliphatic aldehydes requires only passing the olefin in low concentrations in air over the described catalyst. Once the reaction is begun it is self-sustaining because of the exothermic nature thereof.

Fixed bed reactors have been found to be satisfactory for the catalytic oxidation of olefins to aldehydes with the novel catalyst of this invention. A variety of reactors will be found to be useful and multiple tube heat exchanger type reactors are quite satisfactory. The tubes of such reactors may vary in diameter from about ¼ inch to about 2 inches and the length may be varied from about 3 to about 6 or more feet. The oxidation reaction is an exothermic reaction and the catalyst of this invention is somewhat heat sensitive so that relatively close control of the reaction temperature should be maintained. It is desirable to have the surface of the reactors at a relatively constant temperature and some medium to conduct heat from the reactors is necessary to aid in eliminating hot spots and the like. Such media may be Wood's metal, molten sulfur, mercury, molten lead and the like but it has been found that eutectic salt baths are completely satisfactory. One such salt bath is a sodium nitrate-sodium nitrite-potassium nitrate eutectic constant temperature mixture. As will be recognized by the man skilled in the art, the heat exchange medium will be kept at the proper temperature by heat exchangers and the like. The reactor or reaction tubes may be stainless steel, carbon-steel, nickel, glass tubes of the type known as Vycor, a high silica glass, and the like. Both carbon-steel and nickel tubes have excellent long life under the conditions of the reactions described herein. Normally, the reactors contain a preheat zone of an inert material such as ¼ inch Alundum pellets, inert ceramic balls, nickel balls or chips and the like, present at about one-half to one-fourth the volume of catalyst present.

The temperature of the reaction may be varied within some limits, but normally the reaction should be conducted at temperatures within a rather narrow range. The oxidation reaction is exothermic and once the reaction is underway, the main purpose of the salt bath or other media is to conduct heat away from the walls of the reactor and control the reaction. Better operations are normally obtained when the temperature employed is no greater than about 20° above the temperature under a given set of conditions at which optimum conversion to acrolein and methacrolein is obtained. The temperature in the reactor, of course, will depend to some extent upon the size of the reactor and the olefin concentration. Under usual operating conditions, in compliance with the preferred procedure of this invention, the temperature in the center of the reactor, measured by thermocouple, is about 550° C. with isobutylene in air at a concentration of about 1.25 mole percent and at a flow rate of about 150 grams of isobutylene per liter of catalyst per hour. The range of temperature of reactions which preferably are employed in the reactor, measured as above, should be in the range of about 475° C. to about 650° C. Described another way, in terms of salt bath reactors with carbon steel reaction tubes, about one inch in diameter, at the defined flow rate and butene concentrations, the salt bath temperature should be controlled between about 425° C. to about 575° C. In any case, the optimum reaction temperature and/or salt bath temperature for maximum yield of desired aldehyde is readily ascertained and should be observed. Under normal conditions, the temperature in the reactor ordinarily should not be allowed to go above about 600° for extended lengths of time because of possible deactivation of the novel catalyst of this invention.

The aldehydes may be recovered by a number of ways well known to those skilled in the art. For example, by direct condensation or by absorption in suitable media, with subsequent separation and purification of the aldehyde.

*Example 1*

A catalyst for oxidation of isobutylene to methacrolein was prepared as follows. 38.6 grams of vanadium pentoxide $V_2O_5$ was added to 100 milliliters of concentrated hydrochloric acid. The mixture was warmed slowly and after the initial reaction the mixture was refluxed for 24 hours. After a blue solution was obtained, showing that a homogeneous complex of vanadyl chloride, vanadium oxychloride, was formed. 18.35 grams of molybdenum trioxide MoO3 was added to the concentrated vanadium oxychloride. This mixture was refluxed and concentrated to 200 milliliters. 18.1 grams of phosphorous pentoxide $P_2O_5$ was added to the mixture of vanadium and molybdenum oxychlorides. 100 milliliters of hydrochloric acid was also added and the mixture again refluxed to a homogeneous condition. The resulting deep blue solution containing vanadium and molybdenum oxyphosphate and some oxychloride was placed in a cylinder in a heated tumbling device. To the hot mixture was added 425 grams of extracted Alundum. The extracted Alundum, 4 to 8 mesh, which contained 87.8 percent aluminum oxide, 11.2 percent silicon oxide, 0.3 percent ferric oxide, 0.3 titanium oxide and 0.1 percent each of calcium oxide, sodium oxide and potassium oxide by chemical analysis, had a bulk density of 1.9 grams per cubic centimeter and less than one square meter per gram surface as measured by nitrogen absorptions; had been extracted with concentrated hydrochloric acid, washed with distilled water and dried in an oven at 150° C. Deposition of the vanadium-molybdenum phosphate complex on the Alundum was carried out by combined heating, tumbling and stirring at a temperature to obtain slow and gradual drying of the material. After about an hour, a free flowing catalytic material was obtained which had the vanadyl-molybdenum phosphate complex uniformly deposited on the surface of the Alundum. The coated Alundum contained 15 weight percent vanadium-molybdenum phosphate complex of a molar ratio of 0.5 mole $V_2O_5$, 0.3 mole $P_2O_5$ and 0.3 mole $MoO_3$ (about 50 weight percent $V_2O_5$, 25 weight percent $P_2O_5$ and 25 weight percent $MoO_3$).

*Example 2*

300 milliliters of the catalyst of Example 1 was packed in a 3 foot nickel tube, ¾ inch inside diameter, with inert ¼ inch Alundum pellets on top of the catalyst material to a height ⅓ of the height of the catalyst. The reactors were encased in a 7% sodium nitrate—40% sodium nitrate—53% potassium nitrate eutectic mixture constant temperature salt bath. The reactor was slowly warmed to 500° C. while passing a gas stream containing 0.7 mole percent isobutylene in air through the catalyst bed. The reactor bottom pressure was maintained at 1 p.s.i..g. After the reactor had reached 500° C., the catalyst was aged by passing the isobutylene air mixture therethrough for 24 hours. The salt bath temperature was then lowered to 460° C. The isobutylene concentration in the reactor feed stream was increased to one mole percent and collection of methacrolein product begun. The salt bath temperature was adjusted to optimum yield of methacrolein, 490–510° C. The residence time of the gas stream passing through the reactor was less than about one second, calculated at about 0.2 second-reaction conditions.

(1) At a flow rate of 91 grams of isobutylene of a concentration in air of 0.9 percent per liter of catalyst per hour and a salt bath temperature of 505° C., a yield of 101 percent (81 mole percent) methacrolein was obtained.

(2) At a flow rate of 50 and 200 grams of isobutylene per liter of catalyst per hour at concentrations of 0.5 and 1.5 percent in air, excellent conversion rates to methacrolein were obtained.

*Example 3*

Following the procedure of Example 2, a number of catalysts were tested containing varying ratios of $V_2O_5$, $P_2O_5$ and $MoO_3$.

(1) At a flow rate of 100 grams isobutylene per liter of catalyst per hour, a yield of 77 mole percent methacrolein was obtained from a catalyst having a molar ratio of 0.5 $V_2O_5$, 0.6 $P_2O_5$ and 0.3 $MoO_3$ at 540° C. salt bath temperature.

(2) At a flow rate of 100 grams of isobutylene per liter of catalyst per hour, a yield of 81 mole percent methacrolein was obtained with a catalyst containing a molar ratio of 0.5 $V_2O_5$, 0.3 $P_2O_5$ and 0.3 $MoO_3$.

(3) At a flow rate of 100 grams of isobutylene per liter of catalyst per hour, a yield of 61 mole percent methacrolein was obtained with a catalyst containing a molar ratio of 0.5 $V_2O_5$, 0.2 $P_2O_5$ and 0.6 $MoO_3$ at a salt bath temperature of 550° C.

The gaseous feed stream to the oxidation reactors normally will contain air and about one-half to about three mole percent hydrocarbons such as isobutylene. About 1.2 to about 1.5 mole percent of the mono-olefin are satisfactory for optimum yield of product for the process of this invention. Although higher concentrations may be employed, it should be noted that explosive hazards may be encountered at higher concentrations. Concentrations of isobutylene less than about one percent, of course, will reduce the total yields obtained at equivalent flow rates and thus are not normally economically employed.

Air is entirely satisfactory for use with the olefin but it will be understood that synthetic mixtures of oxygen and inert gases, such as nitrogen, also may be employed. The flow rate of the gaseous stream through the reactor may be varied within rather wide limits but a preferred range of operations is at the rate of about 50 to 300 grams of olefin per liter of catalyst per hour and more preferably about 100 to about 250 grams of olefin per liter of catalyst per hour. Residence times of the gas stream will normally be less than about 2 seconds, more preferably less than about one second, and down to a rate, which is easily determined, that less efficient operations are obtained.

We claim:

1. A process for the preparation of unsaturated aliphatic aldehydes which comprises passing at a temperature in the range of about 475° C. to 650° C. a gaseous mixture of a hydrocarbon selected from the group consisting of propylene and isobutylene and oxygen through a tubular reactor containing a vanadium-molybdenum oxyphosphate catalyst complex wherein said catalyst complex contains vanadium, phosphorous and molybdenum calculated as $V_2O_5$, $P_2O_5$ and $MoO_3$ in amounts greater than 35 percent $V_2O_5$, about 15 to 45 percent $P_2O_5$ and about 5 to 45 percent $MoO_3$, said gaseous mixture containing from about one-half to about three mole percent of the said hydrocarbon.

2. A process for the preparation of methacrolein which comprises a passing at a temperature in the range of about 475° C. to 650° C. a gaseous mixture of isobutylene and oxygen through a tubular reactor containing a vanadium-molybdenum oxyphosphate catalyst complex wherein said catalyst complex contains vanadium, phosphorous and molybdenum calculated as $V_2O_5$, $P_2O_5$ and $MoO_3$, in amounts greater than 35 percent $V_2O_5$, about 15 to 45 percent $P_2O_5$ and about 5 to 45 percent $MoO_3$ and said complex is coated onto an inert carrier, said gaseous mixture containing about one-half to about three mole percent isobutylene.

References Cited in the file of this patent

UNITED STATES PATENTS

| | | |
|---|---|---|
| 2,020,671 | Dreyfus | Nov. 12, 1935 |
| 2,180,353 | Foster | Nov. 21, 1939 |
| 2,524,810 | Kimberlin | Oct. 10, 1950 |
| 2,649,477 | Jacobs et al. | Aug. 18, 1953 |
| 2,659,758 | Detling et al. | Nov. 17, 1953 |
| 2,662,921 | Middleton | Dec. 15, 1953 |
| 2,734,874 | Drake et al. | Feb. 14, 1956 |
| 2,773,921 | Rylander et al. | Dec. 11, 1956 |

FOREIGN PATENTS

| | | |
|---|---|---|
| 665,976 | Great Britain | Feb. 6, 1952 |